United States Patent

Tsuchida

Patent Number: 6,163,411
Date of Patent: Dec. 19, 2000

[54] LENS SYSTEM AND IMAGE PICKUP APPARATUS

[75] Inventor: Hirofumi Tsuchida, Kunitachi, Japan

[73] Assignee: Olympus Optical Co., Ltd., Tokyo, Japan

[21] Appl. No.: 09/097,387

[22] Filed: Jun. 16, 1998

[30] Foreign Application Priority Data

Jun. 16, 1997 [JP] Japan ................................ 9-172773

[51] Int. Cl.[7] .............................. G02B 3/00; G02B 15/14
[52] U.S. Cl. ...................... 359/654; 359/682; 359/690; 359/691
[58] Field of Search ................................ 359/654, 676, 359/683, 686–688, 690, 691, 680–682

[56] References Cited

U.S. PATENT DOCUMENTS

| | | | |
|---|---|---|---|
| 4,571,032 | 2/1986 | Someya et al. | 359/654 |
| 4,830,476 | 5/1989 | Aoki | 359/692 |
| 4,976,521 | 12/1990 | Ishii et al. | 359/654 |
| 4,998,807 | 3/1991 | Uzawa et al. | 359/654 |
| 5,221,996 | 6/1993 | Kikuchi | 359/654 |
| 5,321,552 | 6/1994 | Horiuchi et al. | 359/654 |
| 5,841,586 | 11/1998 | Nagaoka | 359/654 |
| 5,973,850 | 10/1999 | Nagaoka | 359/654 |
| 5,995,295 | 11/1999 | Nagaoka | 359/654 |

FOREIGN PATENT DOCUMENTS

| | | |
|---|---|---|
| 63-276013 | 11/1988 | Japan . |
| 64-44907 | 2/1989 | Japan . |
| 2-56515 | 2/1990 | Japan . |
| 7-129694 | 6/1995 | Japan . |

*Primary Examiner*—Georgia Epps
*Assistant Examiner*—Jordan M. Schwartz
*Attorney, Agent, or Firm*—Pillsbury Madison & Sutro LLP

[57] ABSTRACT

A lens system comprising, in order from the object side, a first lens unit having a positive refractive power and a second lens unit having a negative refractive power, configured to change a focal length thereof by varying an airspace reserved between the first and second lens units, and suited for use in electronic image pickup apparatus. The first lens unit is composed only of a single homogeneous lens element and the second lens unit is composed of a single radial type gradient index lens element which has a positive power of medium.

17 Claims, 6 Drawing Sheets

LENS SYSTEM AND IMAGE PICKUP APPARATUS

BACKGROUND OF THE INVENTION a) Field of the Invention

The present invention relates to a lens system to be used in optical instruments and an image pickup apparatus which is equipped with this lens system.

b) Description of the Prior Art

In recent years where optical instruments such as video cameras and digital cameras prevail, zoom lens systems which can vary focal lengths thereof are adopted at a high ratio as lens systems for these optical instruments.

However, a zoom lens system ordinarily requires six to seven lens elements even when it is to be composed of a small number of lens elements or ten or more lens elements when it is to be composed of a large number of lens elements, thereby constituting a hindrance to compact configuration of video cameras and digital cameras. Further, it is common to use four lens elements for composing a zoom lens system for silver salt cameras in a small number of lens elements or ten or more lens elements for composing such a lens system of a larger number of lens elements, thereby also constituting hindrances to compact configuration of lens systems and reduction of manufacturing costs thereof.

On the other hand, lens systems which are disclosed by Japanese Patents Kokai Publication No. Sho 63-276013 and Kokai Publication No. Hei 2-56515 are known as conventional examples of zoom lens systems which are composed of small numbers of lens elements.

The zoom lens system disclosed by Japanese Patent Kokai Publication No. Sho 63-276013 is composed of four lens elements using a radial type gradient index lens element. Further, the zoom lens system disclosed by Japanese Patent Kokai Publication No. Hei 2-56515 is composed of two lens elements using a radial type gradient index lens element.

The zoom lens system disclosed by Japanese Patent Kokai Publication No. Sho 63-276013 is composed of two lens units: in order from the object side, a positive lens unit and a negative lens unit. This zoom lens system has an exit pupil which is located close to the lens system due to the composition described above, thereby being undesirable for use in an electronic image pickup optical system of a video camera or a digital camera since the lens system does not allow a principal ray to be incident perpendicularly onto an image pickup surface. In other words, this zoom lens system is largely deviated from a telecentric condition.

Further, the zoom lens system disclosed by Japanese Patent Kokai Publication No. Hei 2-56515 is composed of a number of lens elements as few as two, but is expensive since both of the lens elements are radial type gradient index lens elements and further makes it difficult to manufacture a material for a radial type gradient index lens element which is disposed on the object side since it has a negative refractive power.

SUMMARY OF THE INVENTION

A primary object of the present invention is to provide a zoom lens system which is nearly telecentric is, composed of a small number of lens elements, has a low manufacturing cost and is suited for use in electronic image pickup optical systems, as well as an image pickup apparatus which uses this zoom lens system.

The lens system according to the present invention which has a first composition is a vari-focal lens system. It is composed, in order from the object side, of a first lens unit having a positive refractive power and a second lens unit having a negative refractive power. A focal length of the lens system is changed by varying an airspace reserved between the first lens unit and the second lens unit. The first lens unit is composed only of a homogeneous lens element, and the second lens unit is composed of a single radial type gradient index lens element made of a medium which has a positive power.

The lens system according to the present invention which has a second composition is a lens system composed, in order from the object side, of a first lens unit having a positive refractive power, a second lens unit having a negative refractive power and a third lens unit having a positive refractive power. A focal length of the lens system is changed by varying airspaces reserved between adjacent lens units. The first lens unit and the second lens unit are composed only of homogeneous lens elements. The third lens unit is composed of a single radial type gradient index lens element made of a medium which has a positive power.

DETAILED DESCRIPTION OF THE PREFERRED EMBODIMENTS

Figure 1:
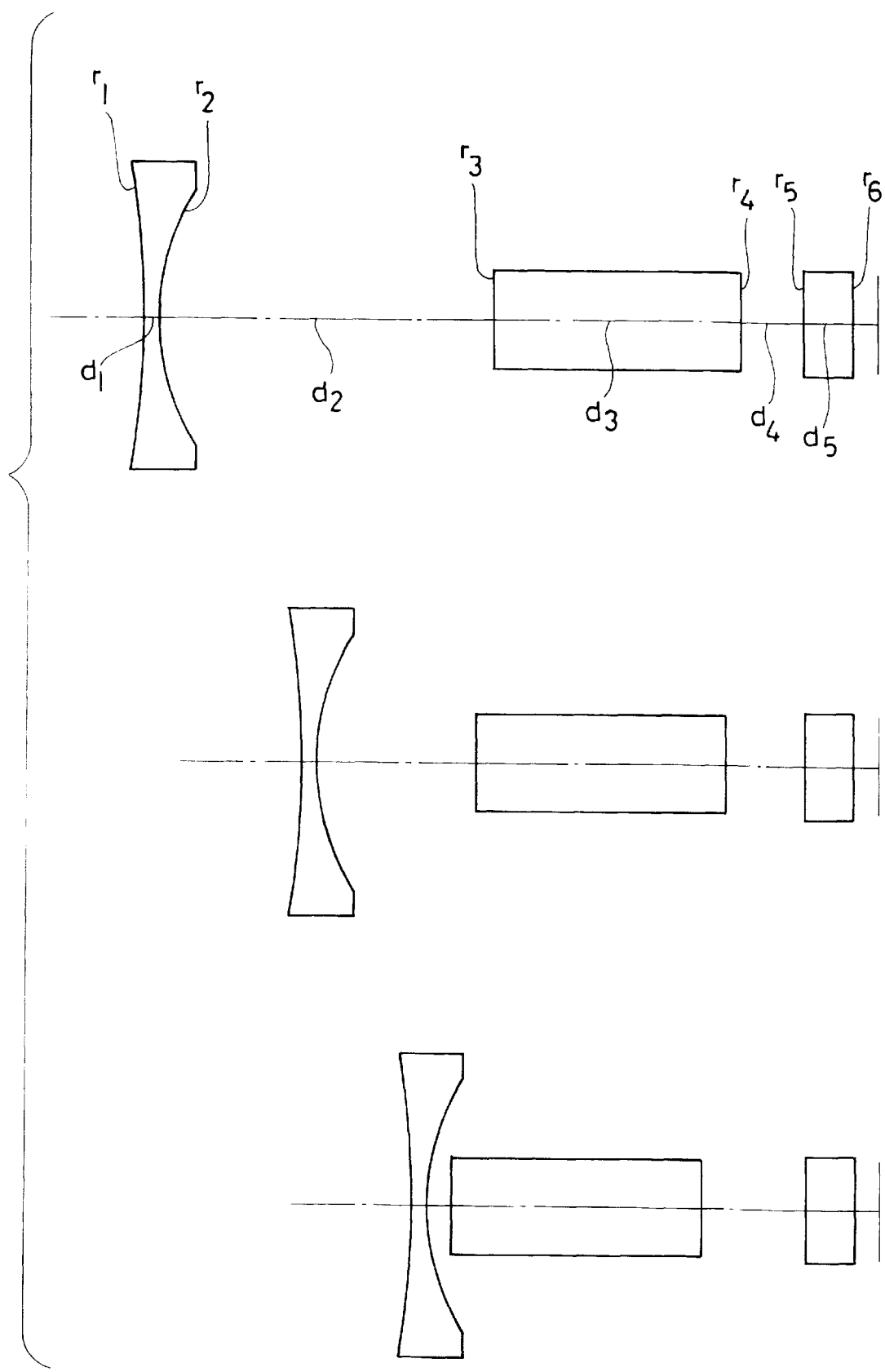
FIGS. 1 through 5 show sectional views illustrating compositions of first through fifth embodiments of the lens system according to the present invention.

The lens system according to the present invention which has a first composition is composed, in order from the object side, of a first lens unit having a negative refractive power and a second lens unit having a positive refractive power, for example as shown in FIG. 1, and configured to change a magnification of the lens system as a whole by varying an airspace reserved between these two lens units: the first lens unit being composed only of a homogeneous lens element and the second lens unit being composed only of a single radial type gradient index lens element made of a medium which has a positive power.

Figure 2:
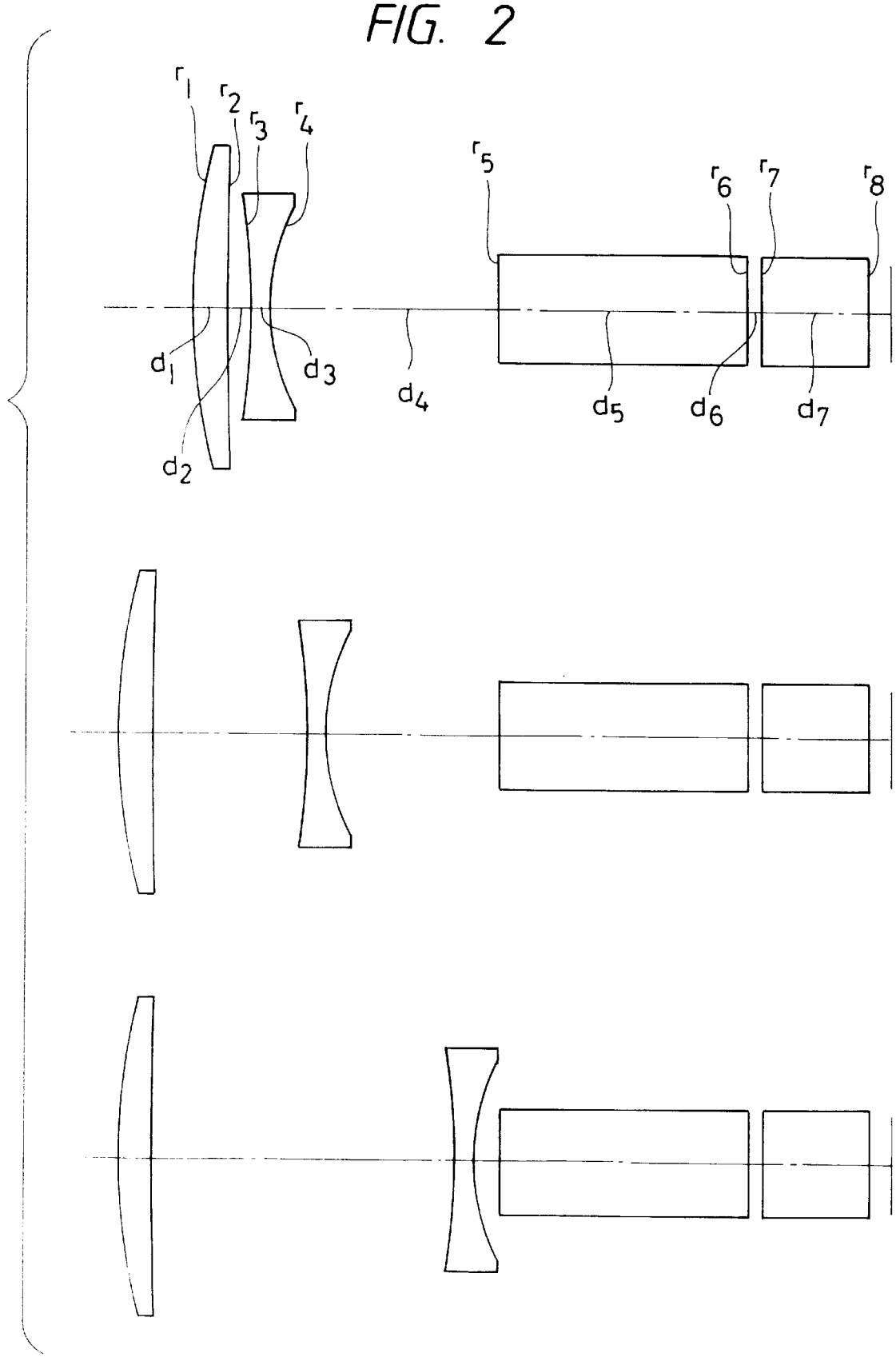

The lens system according to the present invention which has a second composition is composed, in order from the object side, of a first lens unit having a positive refractive power, a second lens unit having a negative refractive power and a third lens unit having a positive refractive power, for example as shown in FIG. 2, and configured to change a magnification of the lens system as a whole by varying airspaces reserved between lens units adjacent to one another: the first lens unit and the second lens unit being composed only of homogeneous lens elements, and the third lens unit being composed only of a single radial type gradient index lens element which is made of a medium which has a positive power.

In order to obtain a zoom lens system which is nearly telecentric and composed of a small number of lens Systems, we compose the lens system, in order from the object side, of a first lens unit having a negative refractive power and a second lens unit having a positive refractive power as described above. A zoom lens system of this type can easily be made telecentric since it requires a small number of lens units to be used for changing a magnification and the lens unit to be disposed on the image side has the positive power.

When each of the lens units is composed of a single homogeneous lens element to compose a lens system which has such a composition as that described above, however, spherical aberration, coma and chromatic aberrations are produced in large amounts, thereby making it difficult to maintain favorable imaging performance. Further, chromatic aberration cannot be corrected even by disposing aspherical surfaces in the lens system though spherical aberration and coma can be corrected with aspherical surfaces.

The lens system according to the present invention is configured to correct the aberrations mentioned above, for example, by composing the first lens unit of a single homogeneous lens element and composing the second lens unit of a single radial type gradient index lens element.

A medium of a radial type gradient index lens element has a refractive index distribution in a direction perpendicular to an optical axis and its refractive index distribution N(r) is expressed by the following formula (a):

$$N(r)=N_0+N_1r^2+N_2r^4+N_3r^6+\ldots \quad (a)$$

wherein the reference symbol $N_0$ represents a refractive index on the optical axis at a standard wavelength, the reference symbol $N_i(i=1, 2, 3)$ designates a coefficient expressing a refractive index at the standard wavelength and the reference symbol r denotes a distance as measured from the optical axis in the direction perpendicular thereto.

Further, Abbe's numbers $V_0$ and $V_i$ of the radial type gradient index lens element are given by the following formulae (b) and (c):

$$V_0=(N_{0d}-1)/(N_{0F}-N_{0C}) \quad (b)$$

$$V_i=N_{id}/(N_{iF}-N_{iC})(i=1, 2, 3, \ldots) \quad (c)$$

wherein the reference symbols $N_{0d}$, $N_{0F}$ and $N_{0C}$ represent refractive indices on the optical axis for the d-line, F-line and the C-line respectively, and the reference symbols $N_{id}$, $N_{iF}$ and $N_{iC}$ designate refractive index distribution coefficients of the 2i'th order for the d-line, F-line and C-line respectively.

A radial type gradient index lens element has a good aberration correcting capability even when it is used independently and when parameters are set adequately, a single radial type gradient index lens element is usable as a lens element which has prettily favorable optical performance.

The lens system according to the present invention which has the first composition is configured to be capable of favorably correcting spherical aberration, coma and chromatic aberration by using the radial type gradient index lens element made of the medium which has the positive power in the second lens unit requiring a strong power the zoom lens system composed of the two lens units described above, i.e., by composing the second positive lens unit only of a single radial type gradient index lens element in the zoom lens system composed of the first negative lens unit and the second positive lens unit.

For the zoom lens system according to the present invention which has the composition described above, it is desirable to satisfy the following conditions (1) and (2):

$$-0.2<N_2\times R_E^2/N_1<0.2 \quad (1)$$

$$V_0<V_1 \quad (2)$$

wherein the reference symbols $N_1$ and $N_2$ represent refractive index distribution coefficients of the second and fourth orders of the radial type gradient index lens element, and the reference symbols $V_0$ and $V_1$ designate the Abbe's numbers of the radial type gradient index lens expressed by the formulae (b) and (c) mentioned above.

For obtaining favorable optical performance with a single radial type gradient index lens element, it is important to impart a power to the lens element so that it produces aberrations in amounts as small as possible and the conditions (1) and (2) are adopted for this purpose.

The condition (1) is required for suppressing to a low level spherical aberration produced by the medium of the radial type gradient index lens element. If the lower limit of −0.2 of the condition (1) is exceeded, spherical aberration will be undercorrected. If the upper limit of 0.2 of the condition (1) is exceeded, in contrast, spherical aberration will undesirably be overcorrected. The condition (2) is required for reducing chromatic aberration to be produced by the medium of the radial type gradient index lens element, thereby maintaining chromatic aberration at a favorable level in the lens system. If the condition (2) is not satisfied, chromatic aberration will undesirably be large.

For using the lens system according to the present invention which has the first composition as a lens system which is to correct aberrations elaborately, it is desirable to satisfy at least either of the following conditions (3) and (4):

$$-0.05<N_2\times R_E^2/N_1<0.05 \quad (3)$$

$$-0.01<1/V_1<0.02 \quad (4)$$

The condition (3) is required to further reduce spherical aberration to be produced by the medium of the radial type gradient index lens element. If the lower limit of −0.05 of the condition (3) is exceeded, spherical aberration will be undercorrected. If the upper limit of 0.05 of the condition (3) is exceeded, in contrast, spherical aberration will be overcorrected.

The condition (4) is required to further reduce chromatic aberration to be produced by the medium of the radial type gradient index lens element, thereby maintaining chromatic aberration at a favorable level in the lens system. If the upper limit of 0.02 of the condition (4) is exceeded, chromatic aberration will be remarkable. If the lower limit of −0.01 of the condition (4) is exceeded, in contrast, chromatic aberration will be produced in the reverse direction.

Taking into consideration an optical effect of the radial type gradient index lens element and facility for manufacturing of a material therefor, it is desirable that a maximum difference $\Delta n$ in refractive index of the radial type gradient index lens element satisfies the following condition (5):

$$0.01<\Delta n<0.2 \quad (5)$$

If the lower limit of 0.01 of the condition (5) is exceeded, the radial type gradient index lens element will exhibit an insufficient function. If the upper limit of 0.2 of the condition (4) is exceeded, in contrast, it will be difficult to manufacture a material for the radial type gradient index lens element.

Even when the first lens unit of the lens system according to the present invention which has the first composition is composed only of a single homogeneous lens element, it is possible to suppress aberrations to be produced within allowable ranges by selecting a power of the first lens unit which is weak as compared with that of the second lens unit. It is desirable that a ratio of a refractive power of the first lens unit relative to that of the second lens unit satisfies the following condition (6):

$$0.06<|\phi_1/\phi_2|<0.6 \quad (6)$$

wherein the reference symbols $\phi_1$ and $\phi_2$ represent refractive powers of the first lens unit and the second lens unit respectively.

The condition (6) is required to suppress amounts of aberrations to be produced by the first lens unit within allowable ranges by adequately weakening a refractive power of this lens unit.

If the upper limit of 0.6 of the condition (6) is exceeded, the first lens unit will have a strong refractive power, thereby producing coma and astigmatism in large amounts. If the lower limit of 0.06 of the condition (6) is exceeded, the first lens unit will have too weak a refractive power, thereby undesirably increasing a total length of the lens system.

For the lens system according to the present invention, it is desirable to dispose an aperture stop in the vicinity of an objective side surface of the radial type gradient index lens element of the second lens unit so that astigmatism will be produced in an amount as small as possible and the lens system will not have so large a diameter. Therefore, it is desirable to satisfy the following condition (7):

$$-0.5 < \phi_2 \cdot D_s < 0.5 \qquad (7)$$

wherein the reference symbol $D_s$ represents a distance as measured along the optical axis from the object side surface of the radial type gradient index lens element in the second lens unit to the aperture stop.

The condition (7) defines a location of the aperture stop. When the aperture stop is disposed within the range defined by the condition (7), astigmatism can be corrected favorably.

If the lower limit of −0.5 or the upper limit of 0.5 of the condition (7) is exceeded, a meridional image surface will be remarkably tilted in the negative direction or in the positive direction, thereby aggravating astigmatism.

Further, for simplifying a structure of a lens barrel, it is desirable that the distance $D_s$ between the aperture stop and the object side surface of the radial type gradient index lens element remains unchanged by changing a magnification.

Though the lens system according to the present invention is composed of the two lens elements, or the first lens unit is composed of the single homogeneous lens element and the second lens unit is composed of the single radial type gradient index lens element in the foregoing description, the first lens unit may be composed of two or more homogeneous lens elements. Aberrations can be corrected more favorably by composing the first lens unit of two or more homogeneous lens elements.

From a viewpoint of manufacturing of lens elements of the lens system according to the present invention, it is effective to compose the first lens unit of a homogeneous lens element and compose the second lens unit of a radial type gradient index lens unit.

When a zoom lens system is composed of a first negative lens unit and a second positive lens unit, the first lens unit tends to have a diameter which is larger than that of the second lens unit. From a viewpoint of manufacturing of lens elements, on the other hand, a smaller diameter facilitates the manufacture of a radial type gradient index lens element which is manufactured by the ion exchange method, whereas an extremely small lens diameter makes working or polishing of a lens element more difficult.

For the reason described above, it is desirable from the viewpoint of the manufacturing of the lens elements to use a homogeneous lens element(s) as the first lens unit which has a relatively large diameter and select a radial type gradient index lens element as the second lens unit which has a small diameter. Further, when a radial type gradient index lens element is selected as the second positive lens unit, it is possible to configure it as a lens element which has a positive refractive power and can be manufactured easier.

Further, a radial type gradient index lens element can be configured so as to have two planar surfaces though it is more desirable for correcting aberrations to configure it so as to have curvature on surfaces thereof. When a radial type gradient index lens element is configured so as to have two planar surfaces, it can be worked easily and at a lower cost though it produces curvature of field which is slightly larger.

The lens system according to the present invention which has a second composition is composed, in order from the object side, of a first lens unit having a positive refractive power, a second lens unit having a negative refractive power and a third lens unit having a positive refractive power, and configured to change a magnification by varying airspaces reserved among adjacent lens units.

The lens system according to the present invention which has the second composition uses a relatively small number of lens elements in the lens units and is configured nearly telecentric by using a positive lens unit on the image side (the third lens unit). A magnification of the lens system according to the present invention which has the second composition may be changed by moving all the three lens units, the second and third lens unit with the first lens unit kept stationary or the first lens unit and the second lens unit with the third lens unit kept stationary.

For composing a zoom lens system of such a type which consists of a first positive lens unit, a second negative lens unit and a third positive lens unit of a small number of lens elements, it is conceivable to compose each of the lens units of a single homogeneous spherical lens element. When the lens system is composed as described above, however, spherical aberration, coma and chromatic aberrations are produced in large amounts, thereby making it difficult to maintain favorable imaging performance. When aspherical surfaces are used as an attempt to correct these aberrations, these surfaces are ineffective for correcting chromatic aberration even if they can correct spherical aberration and coma to certain degrees.

The lens system according to the present invention which has the second composition is configured to favorably correct aberrations by composing the first lens unit of a single homogeneous lens element, composing the second lens unit of a single homogeneous lens element and composing the third lens unit of a single radial type gradient index lens element.

For the lens system according to the present invention which has the second composition, like the zoom lens system according to the present invention which has the first composition consisting of the two lens units, it is desirable that the radial type gradient index lens element used as the third lens unit satisfies the conditions (1) and (2) mentioned above.

A radial type gradient index lens element can be configured so as to have favorable optical performance as an independent lens element and it is important for this purpose to select a power so as to produce aberrations in amounts as small as possible, whereby it is desirable to satisfy the conditions (1) and (2).

When the lens system according to the present invention which has the second composition is to be used as a lens system which elaborately corrects aberrations, it is desirable to satisfy at least either of the conditions (3) and (4) mentioned above.

Taking into consideration an optical effect and facility of manufacturing of a radial type gradient index lens element to be used in the lens system according to the present invention which has the second composition, it is desirable that a maximum refractive index difference Δn thereof satisfies the condition (5) mentioned above.

Even when each of the first lens unit and the second lens unit is composed of a single homogeneous spherical lens element in the lens system according to the present invention which has the second composition, it is possible by selecting a weak power for each of the first lens unit and the second lens unit relative to that of the third lens unit to suppress aberrations to be produced by the first lens unit and the second lens unit within allowable ranges.

In this case, it is desirable that the lens system which has the second composition satisfies the following conditions (8) and (9):

$$0.04<|\phi_1 \cdot \phi_3|<0.4 \quad (8)$$

$$0.1<|\phi_2 \cdot \phi_3|<1.3 \quad (9)$$

wherein the reference symbols $\phi_1$, $\phi_2$ and $\phi_3$ represent refractive powers of the first lens unit, the second lens unit and the third lens unit respectively.

The conditions (8) and (9) are required to suppress amounts of aberrations to be produced by the first lens unit and the second lens unit within the allowable ranges by excessively weakening powers of these lens units.

If the upper limits of these conditions are exceeded, or if the upper limit of 0.4 of the condition (8) and the upper limit of 1.3 of the condition (9) are exceeded, the first lens unit and the second lens unit will have strong powers, thereby producing coma and astigmatism in excessive amounts. If the lower limit of 0.04 of the condition (8) and the lower limit of 0.1 of the condition (9) are exceeded, in contrast, the first lens unit and the second lens unit will have weak powers, thereby prolonging a total length of the lens system.

In the lens system according to the present invention which has the second composition, it is adequate to dispose an aperture stop in the vicinity of an object side surface of the radial type gradient index lens element of the third lens unit so that astigmatism is produced in an amount as small as possible and a diameter of the lens system will not be so large. In this case, it is desirable to dispose an aperture stop so as to satisfy the following condition (10):

$$-0.5<\phi_3 \cdot D_s<0.5 \quad (10)$$

wherein the reference symbol $D_s$ represents a distance as measured from the object side surface of the radial type gradient index lens element to the aperture stop in a direction along the optical axis.

The condition (10) defines a location of an aperture stop. It is possible to favorably correct astigmatism when an aperture stop is disposed at a location within a range defined by the condition (10).

If the lower limit of −0.5 or the upper limit of 0.5 of the condition (10) is exceeded, a meridional image surface will be tilted remarkably in the negative direction or in the positive direction, thereby aggravating astigmatism. Further, it is desirable for simplifying a structure of a lens barrel that a value of $D_s$ remains unchanged during a change of a magnification.

Each of the first lens unit and the second lens unit is composed of a single homogeneous lens element, whereby the lens system according to the present invention which has the second composition as a whole is composed of three lens elements. However, it is possible to correct aberrations more favorably by composing the first lens unit or the second lens unit of an increased number of lens elements.

In the lens system according to the present invention which has the second composition, the homogeneous lens elements are used as the first lens unit and the second lens unit, whereas the radial type gradient index lens element is used as the third lens unit disposed on the image side. Such use of lens is effective from a viewpoint of manufacturing of the lens elements.

In the zoom lens system which is composed of a first positive lens unit, a second negative lens unit and a third positive lens unit, the first lens unit and the second lens unit tend to have diameters larger than that of the third lens unit. Accordingly, the lens system according to the present invention which has the second composition selects the homogeneous lens elements as the first and second lens units which have relatively large diameters, and uses the radial type gradient index lens element as the third lens unit which has a relatively small diameter. This selection is effective from the viewpoint of manufacturing of the lens elements as described above. Further, the composition described above permits using a radial type gradient index lens element which has a positive power and can easily be manufactured.

Furthermore, a radial type gradient index lens element to be used in the lens system according to the present invention can be configured so as to have two planar surfaces, though it is desirable for correction of aberrations to configure it so as to have curvature on surfaces thereof. When a radial type gradient index lens element is configured so as to have two planar surfaces, the lens element can be worked easily, thereby making it possible to remarkably lower a manufacturing cost though such a lens element produces curvature of field in a slightly larger amount.

A vari-focal lens system which has two selectable focal points is obtainable as a modification of the zoom lens system composed of the three lens units described above. It is possible to use the lens system according to the present invention which has the second composition so as to form an image at the same location in two different conditions by moving the second lens unit for a distance including a point of an imaging magnification of 1× while keeping the first lens unit and the third lens unit stationary, for example, as disclosed by Japanese Patent Kokai Publication No. Sho 64-44907, thereby composing a vari-focal lens system which has two selectable focal points.

A vari-focal lens system which has two selectable focal points permits simplifying a lens barrel structure since it is sufficient for this lens system to use only one lens unit as a movable lens unit. Since the lens system which has the two selectable focal points is configured to keep the third lens unit stationary as described above, it does not change the positional relationship between this lens unit and an image pickup device, thereby allowing the radial type gradient index lens element to be integrated with the image pickup device by cementing them to each other.

When the lens unit to be disposed on the image side is composed of a single radial type gradient index lens element which has two planar surfaces, it is possible to compose, of a small number of lens elements and at a low cost, the lens system according to the present invention whether it is the lens system which has the first composition consisting of the two lens units, the lens system which has the second composition consisting of the three lens units or the vari-focal lens system which has the two selectable focal points as the modification of the lens system consisting of the three lens units. That is, the lens system according to the present invention can be manufactured at a low cost when the lens unit to be disposed on the image side and ordinarily requires a strong power is composed of a single lens element which has two planar surfaces and can easily be worked. The characteristic of the present invention described above is not limited to a zoom lens unit which consists of two or three lens units, but useful for making it possible to compose a zoom lens system which consists of four lens units and has favorable optical performance of a small number of lens elements and at a low cost by composing a lens unit to be disposed on the image side of a radial type gradient index lens element which has positive power of medium and two planar surfaces.

When it is required to correct distortion more favorably in the lens system according to the present invention described above, it is possible to correct distortion by using an electronic image pickup device such as a CCD and means for electrically correcting distortion after an image is converted into electric signals by the electronic image pickup device.

It is clear that ultra-compact lens elements will hereafter be required the more and more common digital cameras, portable telephone terminals equipped with cameras an so on, thereby making it necessary to configure lens systems having fixed focal lengths so as to have total lengths not exceeding 10 mm and compose zoom lens systems so as to have total lengths not exceeding 20 mm.

For composing lens systems as described above, it is important to reduce an image pickup size. This is apparent from the fact that image pickup lenses for video cameras have conventionally been made much more compact as images have been configured more compact.

Further, it is necessary to configure lens systems much more compactly as image pickup devices are configured more compactly and taking into consideration the that electronic image pickup optical systems satisfy the telecentric condition, it is required to dispose lens elements having diameters on the order of diagonal lengths of image pickup sizes in the vicinities of image pickup devices.

When lens elements have diameters close to 1 mm, however, such lens elements can hardly be worked by the conventional polishing and pressing techniques and, even if lens elements can be worked by these techniques, they will require remarkably high manufacturing costs. Further, functions of diffractive lens elements which utilize the diffractive effects are weakened due to the principle thereof as lens systems become more compact.

For the reason described above, it is desirable to use radial type gradient index lens elements as lens elements which have extremely small diameters. When a radial type gradient index lens element is used as such a small lens element, it has the benefit that a lens unit which is closest to an image pickup device can be composed of a single lens element, that the lens element can be configured so as to have two planar surfaces, and that the single lens element simplifies assembly and adjustment. Moreover, a radial type gradient index lens element can exhibit a sufficient function of a lens even when it has a diameter not exceeding 1 mm.

Now, description will be made of means for composing a ultra-compact lens system using a radial type gradient index lens element.

In case of the vari-focal lens system described above, it has a total length on the order of 10 times of a diagonal length of an image pickup device as in embodiments which are described later. For obtaining a vari-focal lens system which has a total length not exceeding 20 mm, it is therefore sufficient to select a diagonal length of an effective image pickup size of an image pickup device on the order not exceeding 2 mm which is 1/10 of the total length. A radial type gradient index lens element to be used in this lens system has a diameter of approximately 2 mm. A vari-focal lens system can be configured more compactly by using an image pickup device which is more compact than that mentioned above and a radial type gradient index lens element has a diameter of approximately 4 mm when a vari-focal lens system is allowed to have a total length up to approximately 40 mm.

On the other hand, there lies a limit also in compact configuration of image pickup devices and overly compact image pickup devices require extremely high resolution for lens systems, which in turn is limited by influences due to diffraction.

Assuming that a lens system has an F number of F/2 which is a general value, its resolution is calculated as approximately 1.5 $\mu$m due to Rayleigh's resolution limit.

Considering in accordance with the VGA standard which is currently adopted as a main standard for digital cameras, 480 picture elements in a vertical direction and 640 picture elements in a horizontal direction allow it to assume that the picture elements are arranged at a pitch of 1.5 $\mu$m, thereby giving approximately 1.2 mm as a diagonal length of a pickup image size of an image pickup device. If it is allowed to use picture elements in a number of ¼ of that specified by the VGA standard, a diagonal length of a pickup image size is halved to approximately 0.6 mm.

Taking the telecentric condition into consideration, diameters of radial type gradient index lens elements to be used with such image pickup devices are on the order of diagonal lengths of image pickup sizes, or 0.6 mm to 2 mm.

On the basis of the foregoing description, it is desirable that a radial type gradient index lens element which is to be disposed closest to an image pickup device in a ultra-compact lens system for digital cameras, portable telephone terminals equipped with cameras and so on satisfies the following condition (11):

$$0.5 \text{ mm} < D_R < 4 \text{ mm} \tag{11}$$

wherein the reference symbol DR represents an effective diameter of the radial type gradient index lens element.

If the upper limit of 4 mm of the condition (11) is exceeded, the lens system will be enlarged. If the lower limit of 0.5 mm is exceeded, an image will be blurred or imaging performance of the lens system will be degraded due to diffraction.

Further, when it is necessary to further shorten a total length of the lens system, it is desirable to satisfy, in place of the condition (11), the following condition (11-1):

$$0.5 \text{ mm} < D_R < 2 \text{ mm} \tag{11-1}$$

Now, description will be made of the preferred embodiments of the lens system according to the present invention.

Embodiment 1 f=3.8~7.6, F/2.8, 2ω=65.0°~30.6°, maximum image height 2.0, $f_B$=1.0

| | | | |
|---|---|---|---|
| $r_1$ = −35.1891 | | | |
| | $d_1$ = 0.6000 | $n_1$ = 1.51633 | $v_1$ = 64.1 |
| $r_2$ = 9.7161 | | | |
| | $d_2$ = $D_1$ (variable) | | |
| $r_3$ = ∞ (stop) | | | |
| | $d_3$ = 9.7911 | $n_2$ (gradient index lens element) | |
| $r_4$ = ∞ | | | |
| | $d_4$ = $D_2$ (variable) | | |
| $r_5$ = ∞ | | | |
| | $d_5$ = 2.000 | $n_3$ = 1.51633 | $v_3$ = 64.1 |
| $r_6$ = ∞ | | | | refractive index distribution coefficients $N_0$=1.66400, $N_1$=−9.26×10$^{-3}$, $N_2$=0, $V_0$=38.2, $V_1$=655

| f | 3.8 | 5.3 | 7.6 |
|---|---|---|---|
| $D_1$ | 13.5929 | 6.4649 | 1.0000 |
| $D_2$ | 2.5404 | 3.2066 | 4.2282 |

$R_E=1.8$, $N_2 \cdot R_E^2/N_1=0$, $\phi_2 \cdot D_s=0$, $\Delta n\ 0.03 |\phi_1/\phi_2|=0.44$, $D_R=3.6$ Embodiment 2

$f=4.99\sim11.45$, F/2.8, $2\omega=48.1°\sim19.9°$, maximum image height 2.0, $f_B=0.9652$

| | | | |
|---|---|---|---|
| $r_1 = 24.2640$ | | | |
| | $d_1 = 1.4900$ | $n_1 = 1.7725$ | $v_1 = 49.6$ |
| $r_2 = 247.0769$ | | | |
| | $d_2 = D_1$ (variable) | | |
| $r_3 = -31.6281$ | | | |
| | $d_3 = 0.7900$ | $n_2 = 1.63030$ | $v_2 = 65.44$ |
| $r_4 = 9.1245$ | | | |
| | $d_4 = D_2$ (variable) | | |
| $r_5 = \infty$ (stop) | | | |
| | $d_5 = 10.4840$ | $n_3$ (gradient index lens element) | |
| $r_6 = \infty$ | | | |
| | $d_6 = 9.6000$ | | |
| $r_7 = \infty$ | | | |
| | $d_7 = 4.4000$ | $n_4 = 1.51633$ | $v_4 = 64.1$ |
| $r_8 = \infty$ | | | | refractive index distribution coefficients $N_0=1.65000$, $N_1=-9.26\times10^{-3}$, $N_2=0$, $V_0=40.0$, $V_1=655$

| f | 4.99 | 6.8 | 11.45 |
|---|---|---|---|
| $D_1$ | 1.0000 | 6.5386 | 12.7211 |
| $D_2$ | 9.4923 | 7.1101 | 1.0000 |

$R_E=2.0$, $N_2 \cdot R_E^2/N_1=0$, $\phi_3 \cdot D_s=0$, $\Delta n=0.037 |\phi_1/\phi_3|=0.18$, $|\phi_2/\phi_3|=0.55$, $D_R=4.0$ Embodiment 3

$f=3.62\sim9.06$, F/2.0, $2\omega=48.1°\sim19.0°$, maximum image height 1.5, $f_B=0$

| | | | |
|---|---|---|---|
| $r_1 = 15.5111$ | | | |
| | $d_1 = 1.8000$ | $n_1 = 1.51633$ | $v_1 = 64.1$ |
| $r_2 = 135.8978$ | | | |
| | $d_2 = D_1$ (variable) | | |
| $r_3 = 115.6697$ | | | |
| | $d_3 = 0.6000$ | $n_2 = 1.51633$ | $v_2 = 64.1$ |
| $r_4 = 5.9272$ | | | |
| | $d_4 = D_2$ (variable) | | |
| $r_5 = \infty$ (stop) | | | |
| | $d_5 = 16.5064$ | $n_3$ (gradient index lens element) | |
| $r_6 = \infty$ | | | | refractive index distribution coefficients $N_0=1.66400$, $N_1=-9.26\times10^{-3}$, $N_2=0$, $V_0=38.2$, $V_1=655$

| f | 3.62 | 5.7 | 9.06 |
|---|---|---|---|
| $D_1$ | 0.7000 | 7.6852 | 12.200 |
| $D_2$ | 13.300 | 8.9037 | 1.8000 |

$R_E=2.0$, $N_2 \cdot R_E^2/N_1=0 \phi_3 \cdot D_s=0$, $\Delta n=0.037 |\phi_1/\phi_3|=0.17$, $|\phi_2/\phi_3|=0.48$, $D_R=4.0$ Embodiment 4

$f=2.6\sim26.0$, F/2.8, $2\omega=67.0°\sim7.20$, maximum image height 1.6, $f_B=1.2288$

| | | | |
|---|---|---|---|
| $r_1 = 31.6344$ | | | |
| | $d_1 = 0.6000$ | $n_1\ 32\ 1.80518$ | $v_1 = 25.42$ |
| $r_2 = 17.2935$ | | | |
| | $d_2 = 4.8000$ | $n_2 = 1.60311$ | $v_2 = 60.64$ |
| $r_3 = -839.5322$ | | | |
| | $d_3 = 0.1000$ | | |
| $r_4 = 14.4574$ | | | |
| | $d_4 = 2.8000$ | $n_3 = 1.65160$ | $v_3 = 58.55$ |
| $r_5 = 29.9680$ | | | |
| | $d_5 = D_1$ (variable) | | |
| $r_6 = 35.5729$ | | | |
| | $d_6 = 0.6000$ | $n_4 = 1.80400$ | $v_4 = 46.57$ |
| $r_7 = 4.3160$ | | | |
| | $d_7 = 2.8000$ | | |
| $r_8 = -19.8163$ | | | |
| | $d_8 = 0.6000$ | $n_5 = 1.65160$ | $v_5 = 58.55$ |
| $r_9 = 4.8092$ | | | |
| | $d_9 = 2.6000$ | $n_6 = 1.80518$ | $v_6 = 25.42$ |
| $r_{10} = 64.4091$ | | | |
| | $d_{10} = D_2$ (variable) | | |
| $r_{11} = \infty$ (stop) | | | |
| | $d_{11} = 9.9627$ | $n_7$ (gradient index lens element) | |
| $r_{12} = \infty$ | | | |
| | $d_{12} = D_3$ (variable) | | |
| $r_{13} = \infty$ | | | |
| | $d_{13} = 4.0000$ | $n_8 = 1.51633$ | $v_8 = 64.14$ |
| $r_{14} = \infty$ | | | | refractive index distribution coefficients $N_0=1.66400$, $N_{1d}=-9.2600\times10^{-3}$, $N_{2d}=1.000\times10^{-5}$, $V_0=38.20$, $V_1=655$, $V_2=655$ $N_{1C}=-9.2502\times10^{-3}$, $N_{2C}=1.0081\times10^{-5}$ $N_{1F}=-9.2699\times10^{-3}$, $N_{2F}=1.0011\times10^{-5}$ $N_{1g}=-9.2488\times10^{-3}$, $N_{2g}=1.0563\times10^{-5}$

| f | 2.6 | 8.2 | 26.0 |
|---|---|---|---|
| $D_1$ | 0.6000 | 9.0330 | 15.1161 |
| $D_2$ | 15.0184 | 5.8274 | 1.4599 |
| $D_3$ | 1.2419 | 2.0000 | 0.2842 |

$R_E=1.8$, $N_2 \cdot R_E^2/N_1=0.0035$, $\phi_3 \cdot D_s=0$, $\Delta n=0.03\ |\phi_1/\phi_3|=0.25$, $|\phi_2/\phi_3|=1.20$, $D_R=3.6$ Embodiment 5 f=1.92, F/2.0, 2ω=49.0°, maximum image height 0.8, $f_B = 0$
$r_1 = \infty$ (stop)
　　$d_1 = 5.1200$　　$n_1$ (gradient index lens element)
$r_2 = \infty$ refractive index distribution coefficients $N_0=1.70000$, $N_1=-8.000\times10^{-2}$, $N_2=0$,
$V_0=40.0$, $V_1=655$, $D_R=1.64$ mm, $\Delta n=0.054$ wherein the reference symbols $r_1$, $r_2$, . . . represent radii of curvature on surfaces of respective lens elements, the reference symbols $d_1$, $d_2$, . . . designate thicknesses of the respective lens elements and airspaces reserved therebetween, the reference symbols $n_1$, $n_2$, . . . denote refractive indices of the respective lens elements, and the reference symbols $v_1$, $v_2$ . . . represent Abbe's numbers of the respective lens elements. In the numerical data, lengths such as focal lengths f, image heights and radii of curvature are expressed in a unit of mm. In addition, the d-line is selected as a standard wavelength.

The first embodiment is a zoom lens system which has a composition illustrated in FIG. 1, or is composed of two lens units of two lens elements: in order from the object side, a first lens unit which consists of a single homogeneous concave lens element and a second lens unit which consists of a single radial type gradient index lens element having two planar surfaces. This lens system changes a magnification from a wide position to a tele position by moving the two first and second lens units along an optical axis so as to narrow an airspace reserved between these lens units.

A plane parallel plate which is disposed on the image side of the lens system in the first embodiment is to be supposed as a low pass filter, an infrared cut filter, a CCD protective glass plate and so on.

The second embodiment has a composition illustrated in FIG. 2, or is a zoom lens system which is composed of three lens units: in order from the object side, a first positive lens unit, a second negative lens unit and a third positive lens unit. The second embodiment is a vari-focal lens system wherein the first lens unit consists of a single homogeneous convex lens element, the second lens unit consists of a single homogeneous concave lens element and the third lens unit consists of a radial type gradient index lens element having two planar surfaces.

For changing a magnification from a wide position to a tele position of the second embodiment, the first lens unit and the second lens unit are moved along the optical axis so as to widen an airspace reserved between the first lens unit and the second lens unit, and narrow an airspace reserved between the second lens unit and the third lens unit. The third lens unit kept stationary.

A flat glass plate ($r_7$~$r_8$) disposed on the image side of the lens system in the second embodiment is to be supposed to be a low pass filter, an infrared absorption filter, a CCD protective glass plate and so on.

Figure 3:
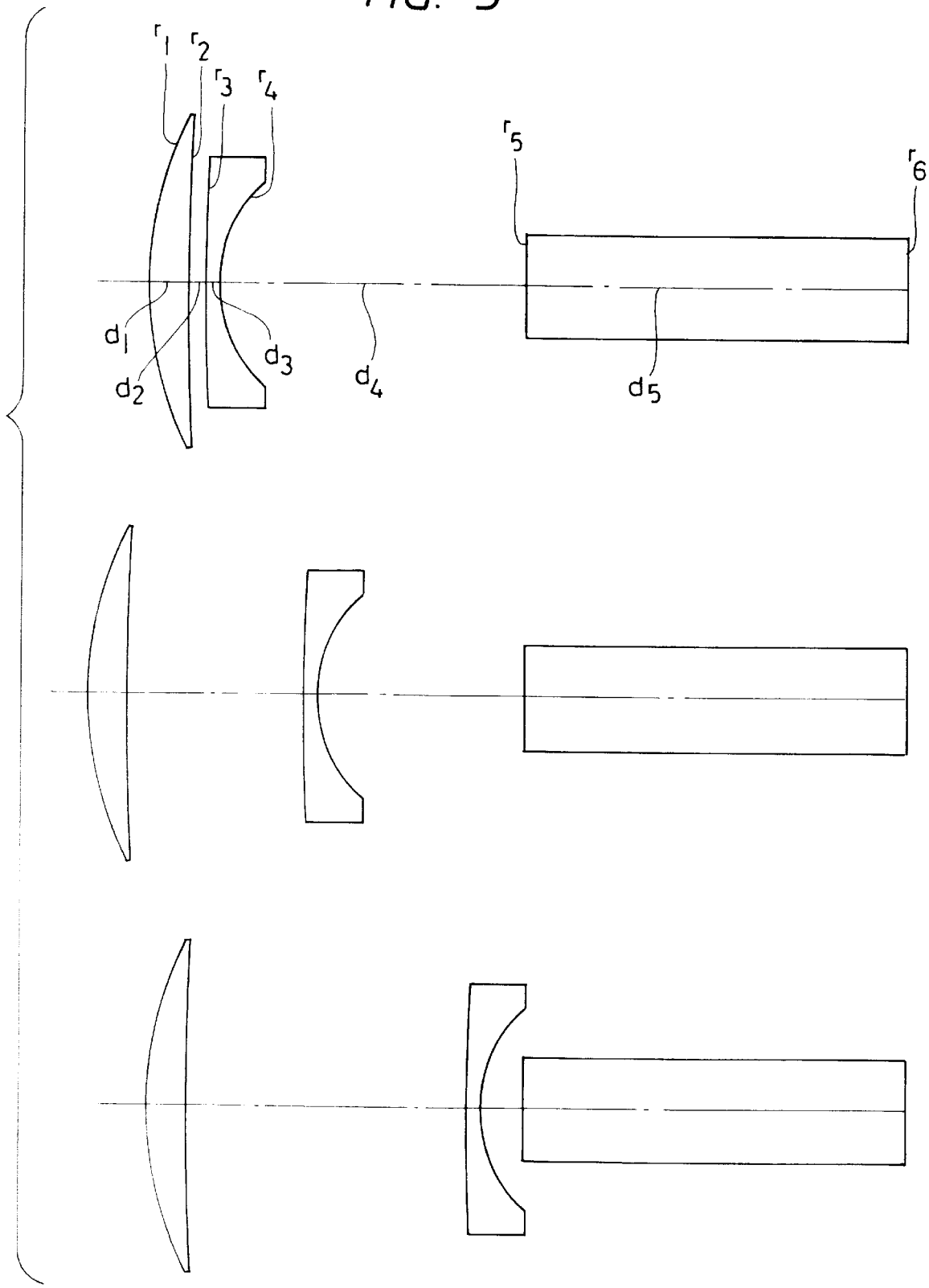

The third embodiment has a composition illustrated in FIG. 3, or is composed, in order from the object side, of a first positive lens unit which consists of a single homogeneous convex lens element, a second negative lens unit which consists of a single homogeneous concave lens element and a third positive lens unit which consists of a single radial type gradient index lens element having two planar surfaces. The third embodiment is composed as a whole of three lens elements.

Like the second embodiment, the third embodiment changes its magnification from a wide position to a tele position by moving the first lens unit and the second lens unit along the optical axis so as to widen an airspace reserved between the first lens unit and the second lens unit, and narrow an airspace reserved between the second lens unit and the third lens unit. The third lens unit is kept stationary during the change of the magnification.

The third embodiment is configured to form an image on an image side surface of the radial type gradient index lens element. The third lens unit is kept stationary during the change of the magnification as described above and an image is always formed on the image side surface of the radial type gradient index lens element during the change of the magnification. It is therefore possible to integrate an image pickup device by cementing it to the image side surface of the radial type gradient index lens element. Further, the third embodiment is configured to set the first lens unit at the same location at the wide position and the tele position. The third embodiment can therefore be modified into a vari-focal lens system which has two selectable focal points using the wide position and the tele position when only the second lens unit is moved between the wide position and the tele position while keeping the first lens unit kept stationary.

Figure 4:
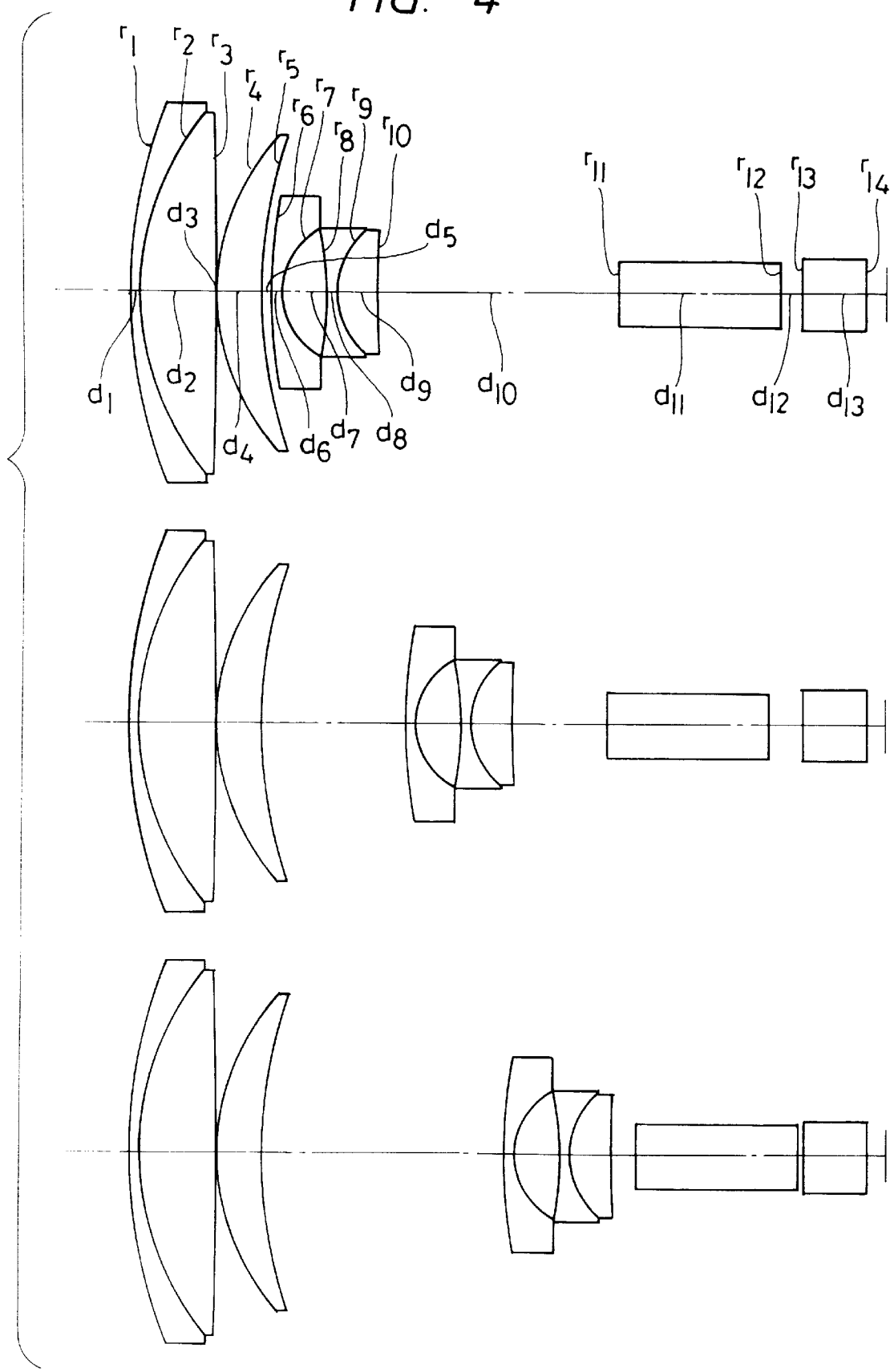

The fourth embodiment is a zoom lens system consisting in order from the object side, of a first positive lens unit, a second negative lens unit and a third positive lens unit, or three lens elements, as shown in FIG. 4.

The fourth embodiment has a composition wherein each of a first lens unit and a second lens unit consists of three homogeneous lens elements, whereas a third lens unit consists of a single radial type gradient index lens element having two planar surfaces.

For changing a magnification of the fourth embodiment from a wide position to a tele position, the second lens unit and the third lens unit are moved along an optical axis so as to widen an airspace reserved between the first lens unit and the second lens unit, and narrow an airspace reserved between the second lens unit and the third lens unit. The first lens unit is kept stationary during the change of the magnification.

Figure 5:
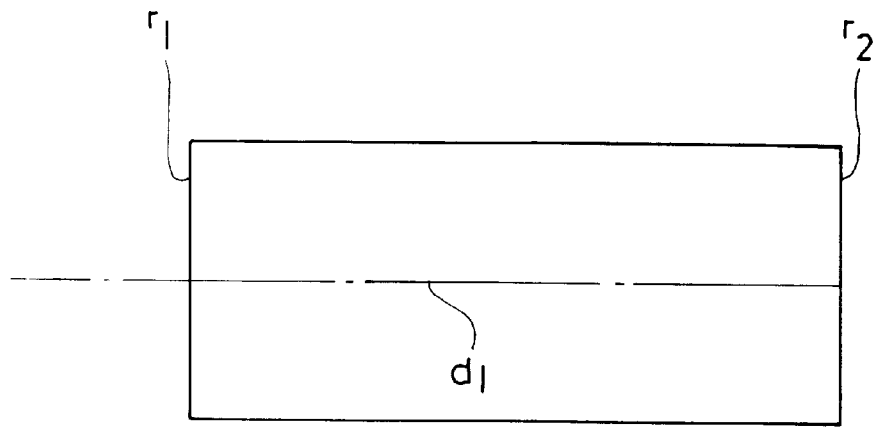

The fifth embodiment consists of a single radial type gradient index lens element as shown in FIG. 5 and an image is formed on an image side surface of the radial type gradient index lens element.

The fifth embodiment is an example of ultra-compact lens system which has an extremely small effective diameter of 1.64 mm. The effective diameter of this lens system satisfies the conditions (11) and (11-1).

Ultra-compact lens system can be obtained by multiplying the numerical data of the first through fourth embodiments by a factor of ⅓. Effective diameters $D_R$ of the lens systems obtainable by multiplying the factor of ⅓ are as listed below:

| | |
|---|---|
| First embodiment | 1.2 mm |
| Second embodiment | 1.33 mm |
| Third embodiment | 1.33 mm |
| Fourth embodiment | 1.2 mm |

As understood from the effective diameter listed above, each of the ultra-compact lens system obtained on the basis of the first through fourth embodiments satisfies the condition (11-1).

Figure 6A:
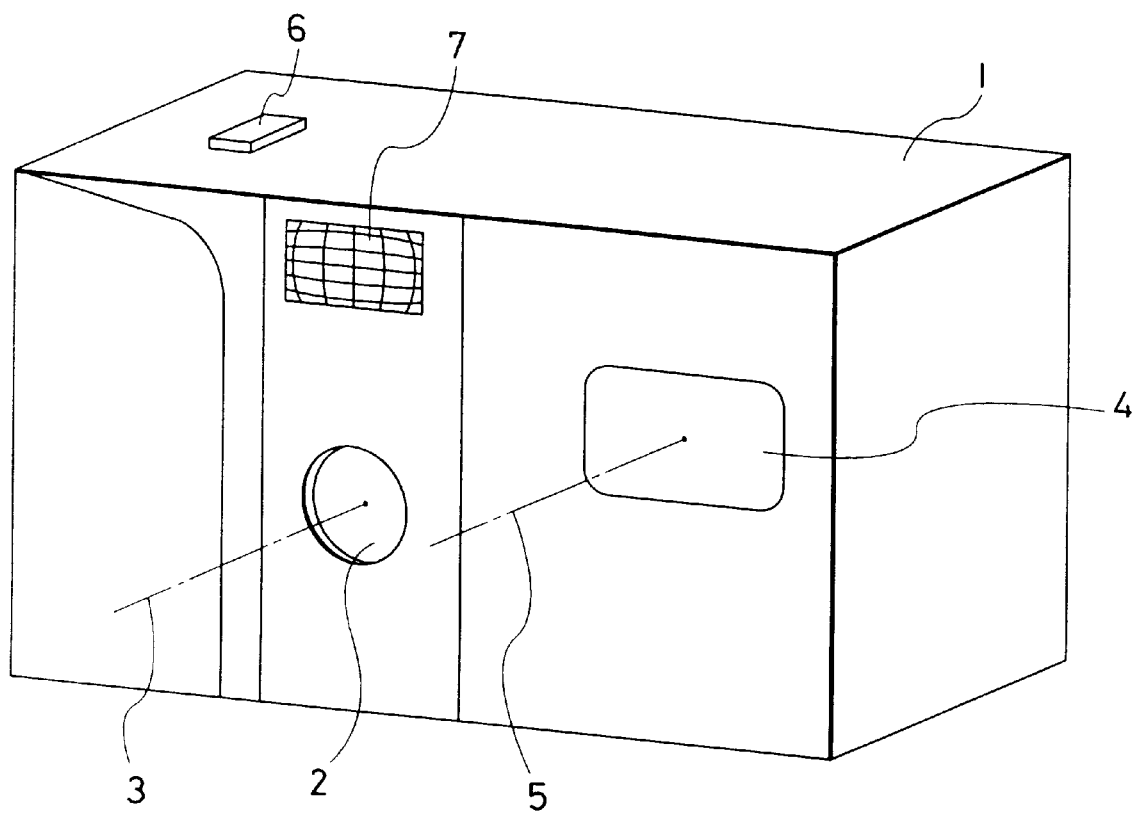
FIGS. 6A, 6B and 6C show views illustrating a configuration of the electronic image pickup apparatus according to the present invention which uses lens systems preferred as the embodiments.
Figure 6B:
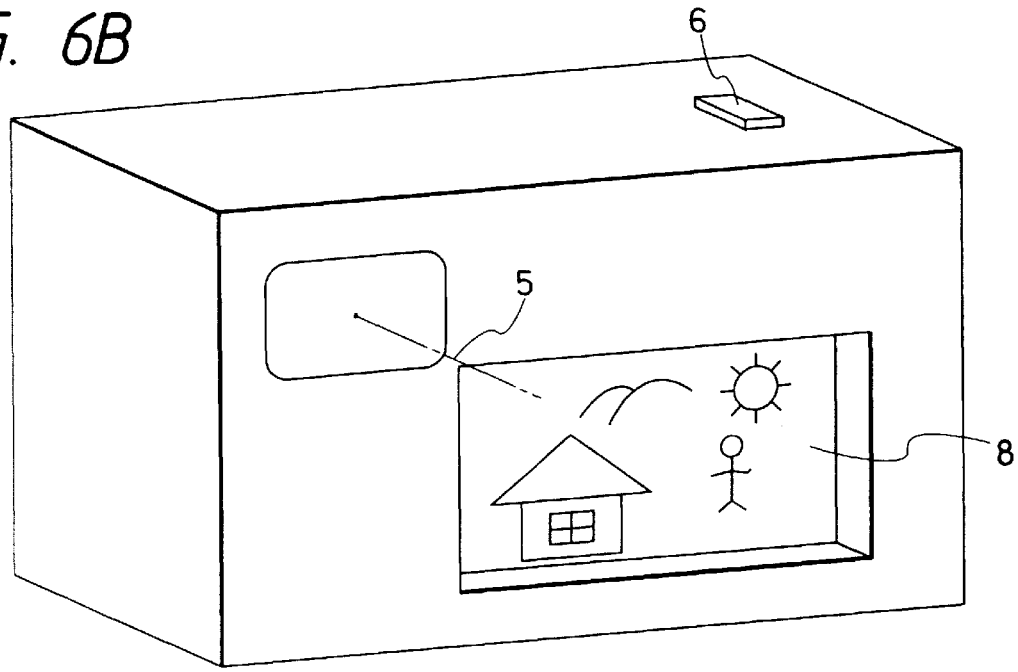
Figure 6C:
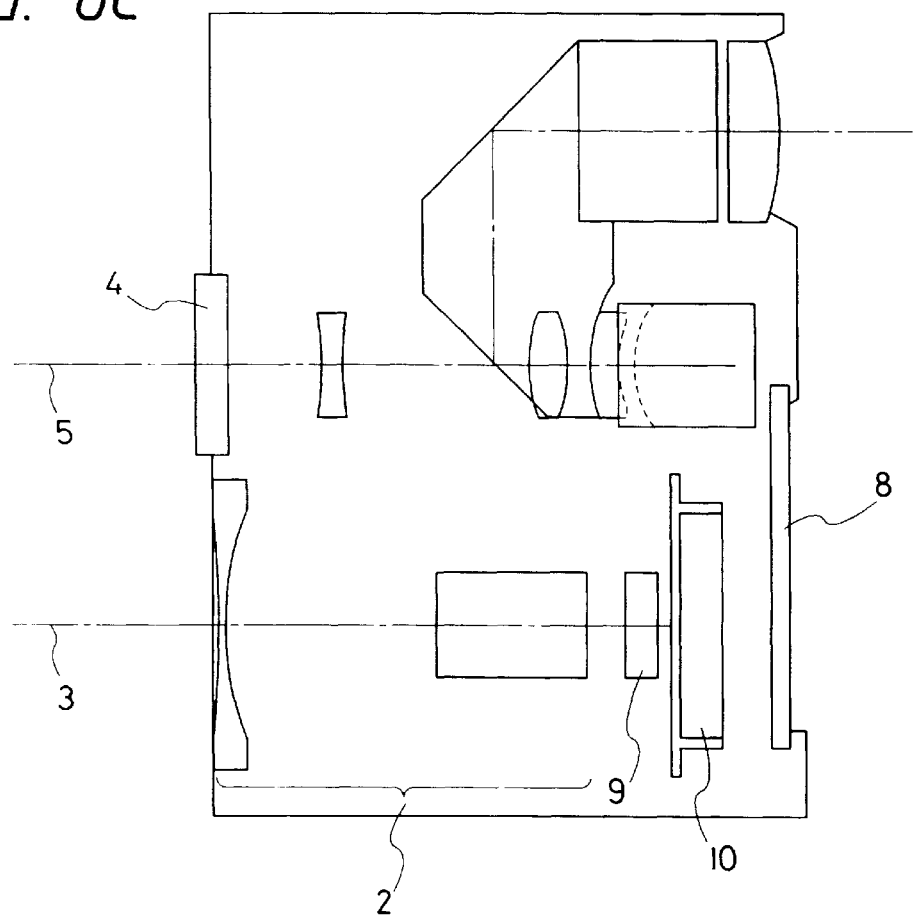

FIGS. 6A, 6B and 6C are diagrams illustrating an embodiment of the image pickup apparatus, or an electronic camera, according to the present invention, FIG. 6A shown a perspective view of the electronic camera as seen from the front. FIG. 6B shows a perspective view of the electronic camera as seen from the rear and FIG. 6C shows a diagram of an optical path illustrating an optical system of the electronic camera. In these drawings, a reference numeral 1 represents a camera body, a reference numeral 2 designates a photographic optical system, a reference numeral 3 denotes a photographic optical path, a reference numeral 4 represents a view finder optical system, a reference numeral 5 designates an optical path for the view finder, a reference numeral 6 denotes a shutter, a reference numeral 7 denotes a flashbulb, a reference numeral 8 represents a liquid crystal display monitor, a reference numeral 9 designates a filter and a reference numeral 10 denotes an electronic image pickup device.

A photographic optical system shown in FIG. 6C is the lens system preferred as the first embodiment shown in FIG. 1, which is composed, in order from the object side, of a first lens unit G1 which consists of a homogeneous concave lens element, a second lens unit G2 which consists of a radial type gradient index lens element having two planar surfaces, filters such as an infrared cut filter and the electronic image pickup device 10 which is disposed on an imaging surface of the photographic optical system 2.

An image of an object formed by the photographic optical system 2 is picked up by the electronic image pickup device 10 and an image recorded by a recorder (not shown) is displayed on the liquid crystal monitor 8.

What is claimed is:

1. A lens system comprising in order from an object side:

a first lens unit having a negative refractive power; and a second lens unit having a positive refractive power, wherein a focal length of said lens system is changed by varying an airspace reserved between said first lens unit and said second lens unit, wherein said first lens unit consists of a single homogeneous lens element, wherein said second lens unit consists of a single radial type gradient index lens element which has a positive power of medium, and wherein said first lens unit is located at a most object side of said lens system.

2. A lens system according to claim 1, wherein said lens system comprises an aperture stop, and said aperture stop is moved together with said radial type gradient index lens element for changing a magnification.

3. A lens system comprising in order from an object side:

a first lens unit having a positive refractive power;

a second lens unit having a negative refractive power;

a third lens unit having a positive refractive power; and an aperture stop, wherein a focal length of said lens system is changed by varying airspaces reserved between adjacent ones of said lens units, wherein said first lens unit and said second lens unit consist of homogeneous lens elements, wherein said third lens unit consists of a single radial type gradient index lens element which has a positive power of medium, and wherein said aperture stop and said radial type gradient index lens element are in contact.

4. A lens system according to claim 3, wherein said first lens unit consists of a single homogeneous lens element.

5. A lens system according to claim 3, wherein said third lens unit is kept stationary during the change of the magnification, and wherein said lens system comprises an image pickup device which is integrated with said third lens unit.

6. An image pickup apparatus having a lens system as claimed in claim 1 or 3.

7. An image pickup apparatus according to claim 6 comprising correcting means which electrically corrects distortion produced by said lens system.

8. An image pickup apparatus comprising:

a lens system according to claim 1 or 3; and an image pickup device, wherein said lens system comprises a radial type gradient index lens element which has two planar surfaces and satisfies the following condition (11):

$$0.5\text{mm} < D_R < 4\text{mm} \tag{11}$$

wherein the reference symbol $D_R$ represents an effective diameter of said radial type gradient index lens element.

9. A lens system according to claim 3, wherein said second lens unit consists of a single homogeneous lens element.

10. A lens system according to claim 9, wherein said lens system comprises an aperture stop, and said aperture stop is moved together with said radial type gradient index lens element for changing a magnification.

11. A lens system according to claim 9, wherein said third lens unit is kept stationary during the change of the magnification, and wherein said lens system comprises an image pickup device which is integrated with said third lens unit.

12. An image pickup apparatus having a lens system as claimed in claim 9.

13. A lens system comprising in order from an object side:

a first lens unit having a positive refractive power;

a second lens unit having a negative refractive power;

a third lens unit having a positive refractive power;

wherein a focal length of said lens system is changed by varying airspaces reserved between adjacent ones of said lens units, wherein said first lens unit and said second lens unit consist of homogeneous lens elements, wherein said third lens unit consists of a single radial type gradient index lens element which has a positive power of medium, said third lens unit is kept stationary during the change of the magnification, and said lens system comprises an image pickup device which is integrated with said third lens unit.

14. A lens system according to claim 13, wherein said radial type gradient index lens element has two planar surfaces.

15. A lens system according to claim 13, wherein said first lens unit consists of a single homogeneous lens element.

16. A lens system according to claim 13, wherein said second lens unit consists of a single homogeneous lens element.

17. A lens system comprising in order from an object side:

a first lens unit which has a positive refractive power and is kept stationary during a change of a magnification;

a second lens unit which has a negative refractive power and is moved for changing a magnification; and a third lens unit which has a positive refractive power and is kept stationary during a change of magnification, wherein said lens system has a focal length which is constructed to be changed by moving said second lens unit, wherein said third lens unit comprises a single radial type gradient index lens element which has a positive power of medium, and wherein said lens system comprises an image pickup device which is integrated with said third lens unit.

* * * * *